US012680879B2

(12) United States Patent
Lindau et al.

(10) Patent No.: US 12,680,879 B2
(45) Date of Patent: Jul. 14, 2026

(54) WARM FILTER CONFIGURATION FOR REDUCING EFFECTS OF REFLECTED INFRARED RADIATION SYSTEMS AND METHODS

(71) Applicant: FLIR Systems AB, Täby (SE)

(72) Inventors: Sten Lindau, Täby (SE); Austin A. Richards, Santa Barbara, CA (US)

(73) Assignee: FLIR Systems AB, Täby (SE)

( * ) Notice: Subject to any disclaimer, the term of this patent is extended or adjusted under 35 U.S.C. 154(b) by 170 days.

(21) Appl. No.: 17/688,781

(22) Filed: Mar. 7, 2022

(65) Prior Publication Data

US 2022/0291047 A1      Sep. 15, 2022

Related U.S. Application Data

(60) Provisional application No. 63/158,842, filed on Mar. 9, 2021.

(51) Int. Cl.
| | |
|---|---|
| *G01J 5/00* | (2022.01) |
| *G01J 5/061* | (2022.01) |
| *G01J 5/0802* | (2022.01) |
| *G01J 5/0806* | (2022.01) |
| *G01N 21/01* | (2006.01) |

(52) U.S. Cl.
CPC ............. *G01J 5/061* (2013.01); *G01J 5/0802* (2022.01); *G01J 5/0806* (2013.01); *G01J 2005/0077* (2013.01); *G01N 2021/015* (2013.01)

(58) Field of Classification Search
CPC ................... G01J 2005/0077; G01N 2021/015
See application file for complete search history.

(56) References Cited

U.S. PATENT DOCUMENTS

| | | | | | |
|---|---|---|---|---|---|
| 9,225,913 | B2 * | 12/2015 | Ekdahl | ................. | H04N 25/673 |
| 2011/0279681 | A1 * | 11/2011 | Cabib | ................... | H04N 23/20 |
| | | | | | 348/E5.09 |

* cited by examiner

*Primary Examiner* — Uzma Alam
*Assistant Examiner* — Shun Lee
(74) *Attorney, Agent, or Firm* — Haynes and Boone, LLP

(57) ABSTRACT
Various techniques are disclosed to reduce the effect of reflected infrared radiation on cooled thermal imaging systems. In one example, a system includes an integrated dewar cooler assembly (IDCA) configured to maintain an interior volume at a constant temperature. The system also includes a thermal imager disposed within the interior volume and configured to capture thermal images. The system also includes an optical element external to the IDCA and configured to provide reflected infrared radiation in a uniform distribution over a field of view of the thermal imager in response to emitted infrared radiation from the thermal imager. Additional methods, devices, and systems are also provided.

20 Claims, 8 Drawing Sheets

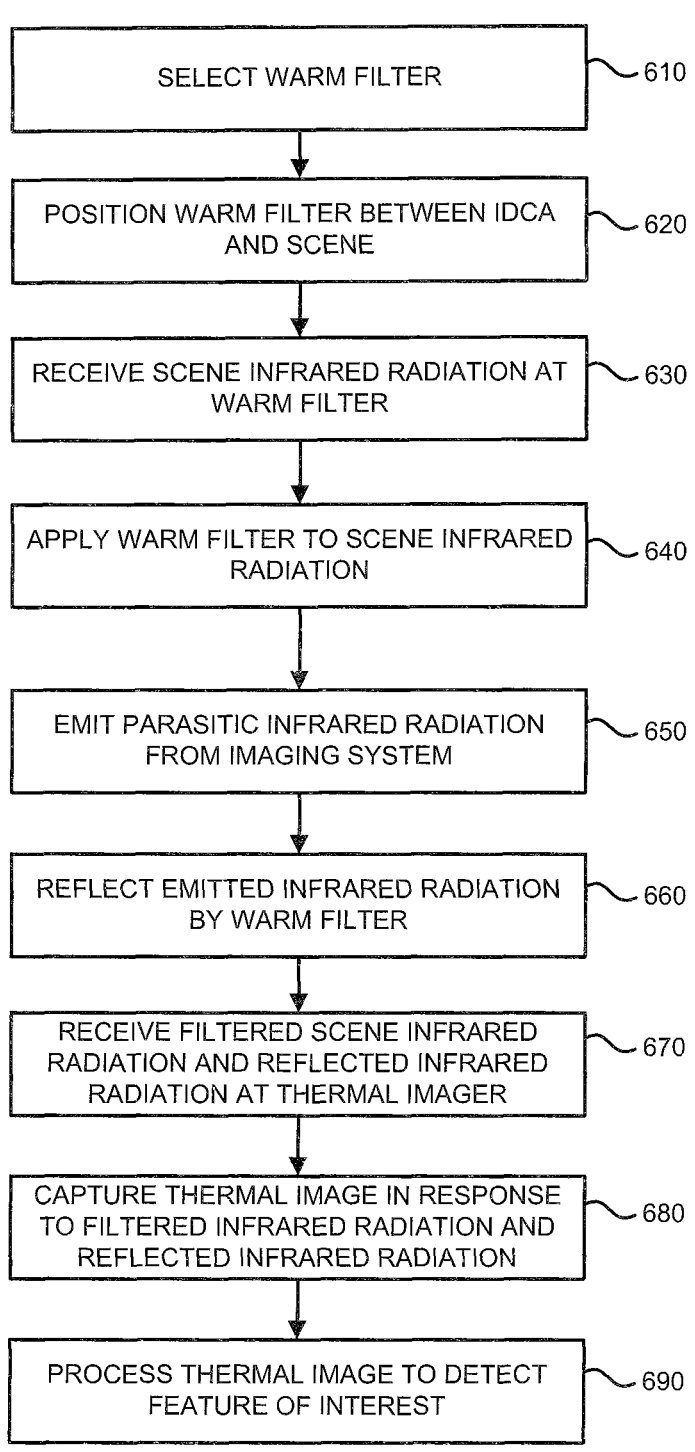

SELECT WARM FILTER — 610

POSITION WARM FILTER BETWEEN IDCA AND SCENE — 620

RECEIVE SCENE INFRARED RADIATION AT WARM FILTER — 630

APPLY WARM FILTER TO SCENE INFRARED RADIATION — 640

EMIT PARASITIC INFRARED RADIATION FROM IMAGING SYSTEM — 650

REFLECT EMITTED INFRARED RADIATION BY WARM FILTER — 660

RECEIVE FILTERED SCENE INFRARED RADIATION AND REFLECTED INFRARED RADIATION AT THERMAL IMAGER — 670

CAPTURE THERMAL IMAGE IN RESPONSE TO FILTERED INFRARED RADIATION AND REFLECTED INFRARED RADIATION — 680

PROCESS THERMAL IMAGE TO DETECT FEATURE OF INTEREST — 690

Fig. 6

WARM FILTER CONFIGURATION FOR REDUCING EFFECTS OF REFLECTED INFRARED RADIATION SYSTEMS AND METHODS

CROSS-REFERENCE TO RELATED APPLICATIONS

This application claims priority to and the benefit of U.S. Provisional Patent Application No. 63/158,842 filed on Mar. 9, 2021 and entitled "WARM FILTER CONFIGURATION FOR REDUCING EFFECTS OF REFLECTED INFRARED RADIATION SYSTEMS AND METHODS" which is hereby incorporated by reference in its entirety.

TECHNICAL FIELD

The present invention relates generally to infrared imaging and, more particularly, to reducing the effects of undesired reflected infrared radiation.

BACKGROUND

In the field of thermal imaging, infrared radiation is frequently filtered to capture thermal images corresponding to desired wavelength ranges. In gas detection systems, a bandpass filter may be employed having a center wavelength that corresponds to an absorption feature of a gas desired to be detected. For example, a system for detecting methane gas may employ a bandpass filter that passes wavelengths between 3.2 and 3.4 microns.

In certain thermal imaging systems, a thermal imager is deployed in an integrated dewar cooler assembly (IDCA) having a cryocooler to maintain the thermal imager at a specified low temperature (e.g., 77K in some embodiments where the thermal imager is implemented by an InSb focal plane array). In such systems, the filter may also be deployed in the IDCA and thus also maintained at the low temperature (e.g., also referred to as a "cold filter").

The positioning of the filter within the IDCA reduces the likelihood that infrared radiation originating within the IDCA (e.g., infrared radiation from the thermal imager or camera system itself that may also be outside the wavelength passband of the filter) may be reflected by the filter back from the filter to the thermal imager and thus captured by the thermal imager. Cooling the filter also reduces its in-band self-emission to negligible levels. In this regard, because the filter, thermal imager, and interior of the IDCA are maintained at a known low temperature, such reflected infrared radiation may be negligible.

However, such implementations have limited flexibility in operation. For example, because the cold filter is permanently positioned within the IDCA, the imaging system may be limited to capturing thermal images at only predetermined fixed wavelength ranges. As a result, the imaging system may be limited to detecting only one or more specific gases or other features of interest. However, if the filter is positioned outside the IDCA (e.g., to provide convenient replacement or exchange), it will no longer be cooled but rather will exhibit an ambient environmental temperature (e.g., a "warm" filter). Such a configuration is susceptible to reflecting undesirable out-of-band radiation to the thermal imager, resulting in spatial non-uniformities in captured thermal images (e.g., corners of the thermal images appear warmer than the center). Accordingly, there is a need for a thermal imaging system that provides for capturing thermal images associated with a variety of different wavelength ranges without causing undesirable effects associated with reflected infrared radiation.

SUMMARY

Various techniques are provided for using optical elements such as filters and/or lenses to reduce undesirable artifacts in thermal images resulting from reflected infrared radiation. In some embodiments, an optical element such as a curved warm filter is provided with a curved concave surface configured to reflect out-of-band radiation back to a thermal imager in a uniform distribution. In other embodiments, one or more lenses may be provided with the curved warm filter to correct for possible aberrations caused by the curved warm filter. In other embodiments, an optical element such as a lens provides the uniform distribution using out-of-band radiation reflected by a flat warm filter.

In one embodiment, a system includes an integrated dewar cooler assembly (IDCA) configured to maintain an interior volume at a constant temperature; a thermal imager disposed within the interior volume and configured to capture thermal images; and an optical element external to the IDCA and configured to provide reflected infrared radiation in a uniform distribution over a field of view of the thermal imager in response to emitted infrared radiation from the thermal imager.

In another embodiment, a method includes operating an integrated dewar cooler assembly (IDCA) to maintain an interior volume at a constant temperature; operating a thermal imager disposed within the interior volume to capture thermal images; and providing, by an optical element external to the IDCA, reflected infrared radiation in a uniform distribution over a field of view of the thermal imager in response to emitted infrared radiation from the thermal imager.

The scope of the invention is defined by the claims, which are incorporated into this section by reference. A more complete understanding of embodiments of the invention will be afforded to those skilled in the art, as well as a realization of additional advantages thereof, by a consideration of the following detailed description of one or more embodiments. Reference will be made to the appended sheets of drawings that will first be described briefly.

BRIEF DESCRIPTION OF THE DRAWINGS

FIG. 6 illustrates a process of capturing thermal images in accordance with an embodiment of the disclosure.

Embodiments of the present invention and their advantages are best understood by referring to the detailed description that follows. It should be appreciated that like reference numerals are used to identify like elements illustrated in one or more of the figures.

DETAILED DESCRIPTION

Figure 1:
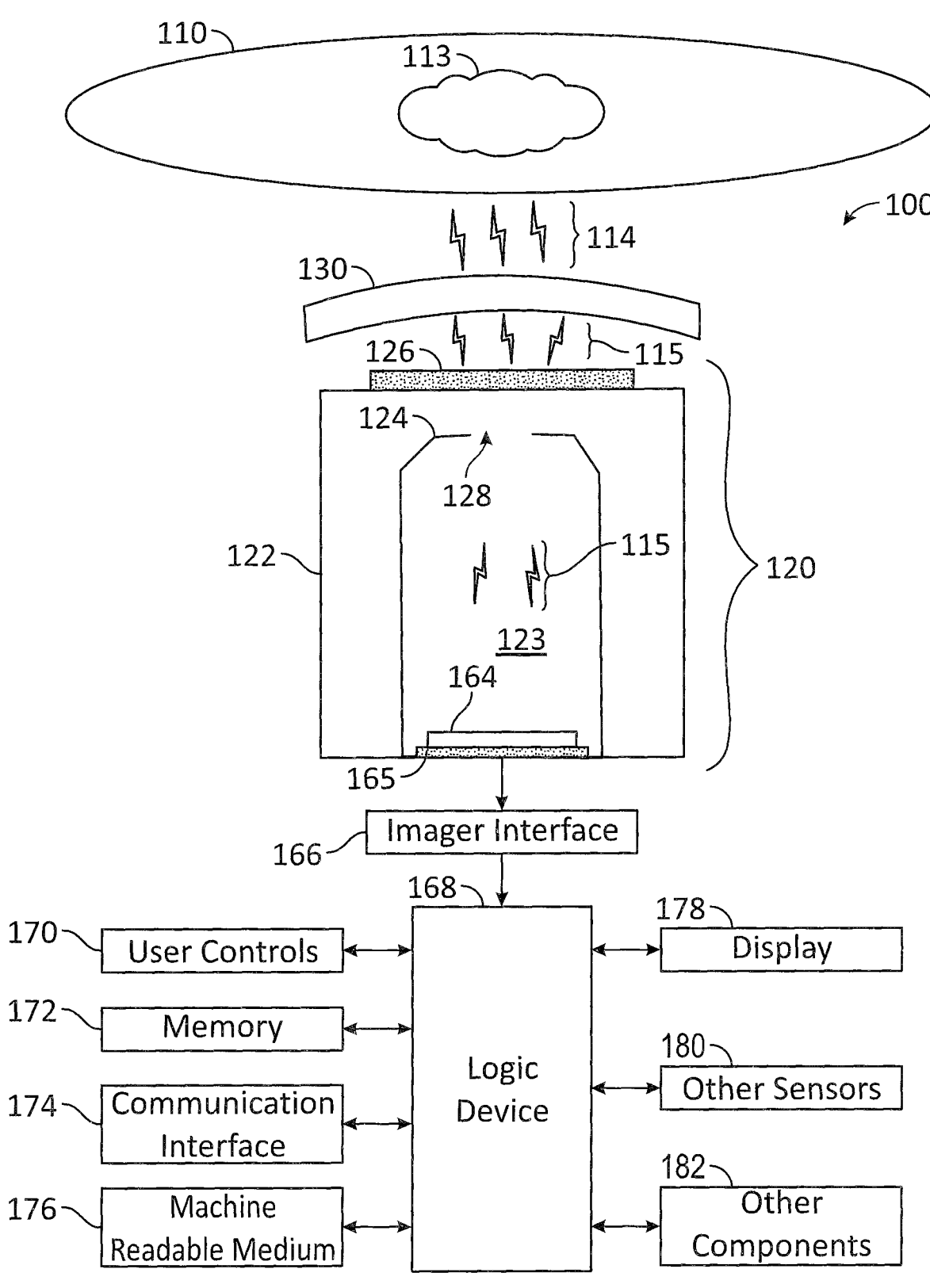
FIG. 1 illustrates a block diagram of an imaging system in accordance with an embodiment of the disclosure.

In accordance with embodiments discussed herein, various systems and methods are provided to reduce the effect of reflected infrared radiation on cooled thermal imaging systems. In various embodiments, a curved optical element may be positioned external to an integrated dewar cooler assembly (IDCA) that includes a temperature controlled thermal imager. As a result, the curved optical element may be a "warm" optical element having a temperature corresponding to an ambient environmental temperature, whereas the thermal imager may be "cold" having a lower temperature maintained by the IDCA. The curved surface of the optical element is configured to receive infrared radiation emitted by the thermal imager and reflect the infrared radiation in a uniform distribution over a field of view of the thermal imager. As a result, thermal images captured by the thermal imager may exhibit improved uniformity as further discussed herein.

In some embodiments, the optical element may be an interference-type bandpass filter including a concave curved surface facing the focal plane of a thermal imager (e.g., a focal plane array) of a cooled camera and also including an opposite curved convex back surface (e.g., the filter exhibiting a uniform thickness) to reduce possible lensing effects by the filter. The filter may be positioned outside the warm (e.g., ambient environmental temperature) window of an IDCA. The concave curved surface of the filter is configured to precisely reflect the cold thermal imager back on itself (e.g., operating as a uniform retroreflector) with a much higher degree of spatial uniformity than a traditional flat bandpass filter.

Bandpass filters designed around interference layers will reflect out-of-band infrared radiation and transmit in-band infrared radiation. The narrower the filter passband, the greater the amount of reflected infrared radiation outside the passband. These bandpass filters tend to have low absorption, so their infrared emission is low as well.

However, a flat-surfaced bandpass filter at ambient environmental temperature (e.g., a flat warm filter) in close proximity to a window of an IDCA containing a cold thermal imager may reflect the cold thermal imager in a manner that will cause a captured thermal image to exhibit nonuniformity in the form of a large cold spot (e.g., also referred as a cold dark "bullseye") in the center of the thermal image, while the corners of the thermal image will look warm. This strong reflection effect (e.g., also referred to as a narcissus effect or narcissus reflection as the thermal imager is effectively imaging itself as a result of the infrared radiation reflected by the filter) is because an interference bandpass filter will reflect infrared radiation generated by the camera system that is out-of-band (e.g., out of the filtered range of wavelengths passed by the filter).

At the same time, reflected out-of-band energy from the inside of the camera body (e.g., also referred to as parasitic infrared radiation) that will make the corners of the thermal image much warmer than the center. In this regard, additional out-of-band infrared radiation may be emitted by interior surfaces of the camera that are 10 C to 15 C warmer than the ambient environmental temperature and at least 5 C hotter than the inside of the camera lens. The corners of the thermal image will be brightened/warmed up by the out-of-band infrared radiation that is strongly reflected off the back of the filter into the IDCA's coldstop.

The contrast between the cold spot and the warm corners becomes more and more pronounced at longer integration times. The problem with such bandpass filters is that they are physically flat, and what they reflect varies greatly with position relative to the optical centerline of the coldstop of the IDCA. The center of the filter reflects the cold thermal imager surface, but closer to the edges of the filter, the reflections will be of surfaces outside of the IDCA which are at the interior temperature of the camera (e.g., reflections off a bezel around a warm window on the IDCA; such reflections may be of interior spaces of the camera and of a lens interface).

The occurrence of the cold spot and warm corners in thermal images greatly limits the maximum possible integration time that can be used for the thermal imager. It also limits the scene dynamic range of the thermal imager, since the corners and the center of the thermal image will tend to be at very different digital count levels. Although offset correction terms may be applied to the thermal image to make it appear more uniform, the parasitic infrared radiation inside the camera will tend to change over time as the camera heats up or ambient environmental temperature conditions change, which has the effect of bringing back the cold spot and making the thermal image highly nonuniform once again. Moreover, the usable dynamic range of the thermal imager may be severely limited by the large magnitude of the offset correction terms.

By providing a curved warm filter in accordance with various embodiments discussed herein, improvements over flat warm filter implementations can be realized including, for example, improved thermal image uniformity, lower pedestal which enables increased dynamic range and higher integration times for greater sensitivity, and reduced temporal noise.

In some embodiments, a flat warm filter and a lens may be used in place of the curved warm filter. In such cases, the lens may provide the concave surface facing the thermal imager, with the filter positioned between the lens and the scene to be imaged. Additional examples of such configurations are further discussed herein.

Turning now to the drawings, FIG. 1 illustrates a block diagram of an imaging system 100 in accordance with an embodiment of the disclosure. As shown, imaging system 100 includes an IDCA 120, a curved warm filter 130, an imager interface 166, a logic device 168, user controls 170, a memory 172, a communication interface 174, a machine readable medium 176, a display 178, other sensors 180, and other components 182.

In various embodiments, imaging system 100 (e.g., an imaging system) may be implemented, for example, as a camera system such as a portable (e.g., handheld) camera system, a small form factor camera system implemented as part of another device, a fixed camera system, and/or other appropriate implementations. Imaging system 100 may be positioned to capture thermal images in response to infrared radiation 114 of various wavelengths from a scene 110. In various embodiments, scene 110 may include various features of interest such as a gas 113 of interest to be detected. Accordingly, imaging system 100 may be a gas detection camera in some embodiments.

IDCA 120 includes a dewar 122 having a cryocooler 165 that maintains an interior volume 123 of a coldshield 124 at a constant temperature (e.g., a temperature lower than that of the external environment). A thermal imager 164 (e.g., a plurality of thermal imaging sensors implemented as a focal plane array) is disposed within the interior volume 123 and therefore is also maintained at the constant temperature. Coldshield 124 includes a coldstop 128 (e.g., an aperture in coldshield 124) which defines a field of view of thermal imager 164. IDCA 120 also includes a transmissive window 126 that seals dewar 122 and passes infrared radiation between the external environment and interior volume 123 (e.g., because window 126 is external to the cooled interior volume 123, it is also referred to as a "warm" window).

Curved warm filter 130 receives infrared radiation 114 from scene 110 and passes filtered infrared radiation 115 corresponding to a filtered wavelength range (e.g., a wavelength range corresponding to an absorption wavelength range associated with gas 113). Filtered infrared radiation 115 passes through window 126 into interior volume 123 of IDCA 120 where it is captured by thermal imager 164 as one or more thermal images. As further discussed herein, curved warm filter 130 may also reflect infrared radiation originating from thermal imager 164 in a uniform distribution over the field of view defined by coldstop 128 in a manner that provides improved uniformity in the captured thermal images.

Although a single optical element in the form of curved warm filter 130 is shown in FIG. 1, other configurations of optical elements are contemplated. For example, in some cases, multiple optical elements may be provided in place of or in addition to curved warm filter 130 such as a flat warm filter and one or more lenses as further discussed herein with regard to FIGS. 5A-D.

Thermal imager 164 may include an array of sensors for capturing images (e.g., image frames) of scene 110. For example, in some embodiments, thermal imager 164 may be a focal plane array (FPA) including an array of unit cells and a read out integrated circuit (ROIC). Each unit cell may be provided with an infrared detector (e.g., a microbolometer or other appropriate sensor) and associated circuitry to provide image data for a pixel of a captured thermal image. In this regard, time-multiplexed electrical signals may be provided by the unit cells to the ROIC. In some embodiments, thermal imager 164 may also include one or more analog-to-digital converters for converting analog signals captured by the sensors into digital data (e.g., pixel values) to provide the captured thermal images. Further descriptions of ROICs and infrared sensors (e.g., microbolometer circuits) may be found in U.S. Pat. No. 6,028,309 issued Feb. 22, 2000, which is incorporated herein by reference in its entirety.

Imager interface 166 provides the captured thermal images to logic device 168 which may be used to process the thermal images, store the original and/or processed thermal images in memory 172, and/or retrieve stored thermal images from memory 172.

Although a single thermal imager 164 is illustrated, a plurality of thermal imagers 164 and associated components may be provided in other embodiments. For example, different thermal imagers 164 and/or non-thermal imagers may be provided to capture the same or different radiation wavelengths simultaneously to provide associated captured images in some embodiments.

Logic device 168 may include, for example, a microprocessor, a single-core processor, a multi-core processor, a microcontroller, a programmable logic device configured to perform processing operations, a digital signal processing (DSP) device, one or more memories for storing executable instructions (e.g., software, firmware, or other instructions), and/or any other appropriate combinations of devices and/or memory to perform any of the various operations described herein. Logic device 168 is configured to interface and communicate with the various components of imaging system 100 to perform various method and processing steps described herein. In various embodiments, processing instructions may be integrated in software and/or hardware as part of logic device 168, or code (e.g., software and/or configuration data) which may be stored in memory 172 and/or a machine readable medium 176. In various embodiments, the instructions stored in memory 172 and/or machine readable medium 176 permit logic device 168 to perform the various operations discussed herein and/or control various components of imaging system 100 for such operations.

Memory 172 may include one or more memory devices (e.g., one or more memories) to store data and information. The one or more memory devices may include various types of memory including volatile and non-volatile memory devices, such as RAM (Random Access Memory), ROM (Read-Only Memory), EEPROM (Electrically-Erasable Read-Only Memory), flash memory, fixed memory, removable memory, and/or other types of memory.

Machine readable medium 176 (e.g., a memory, a hard drive, a compact disk, a digital video disk, or a flash memory) may be a non-transitory machine readable medium storing instructions for execution by logic device 168. In various embodiments, machine readable medium 176 may be included as part of imaging system 100 and/or separate from imaging system 100, with stored instructions provided to imaging system 100 by coupling the machine readable medium 176 to imaging system 100 and/or by imaging system 100 downloading (e.g., via a wired or wireless link) the instructions from the machine readable medium (e.g., containing the non-transitory information).

Logic device 168 may be configured to process captured images and provide them to display 178 for presentation to and viewing by the user. Display 178 may include a display device such as a liquid crystal display (LCD), an organic light-emitting diode (OLED) display, and/or other types of displays as appropriate to display images and/or information to the user of imaging system 100. Logic device 168 may be configured to display images and information on display 178. For example, logic device 168 may be configured to retrieve images and information from memory 172 and provide images and information to display 178 for presentation to the user of imaging system 100. Display 178 may include display electronics, which may be utilized by logic device 168 to display such images and information.

User controls 170 may include any desired type of user input and/or interface device having one or more user actuated components, such as one or more buttons, slide bars, knobs, keyboards, joysticks, and/or other types of controls that are configured to generate one or more user actuated input control signals. In some embodiments, user controls 170 may be integrated with display 178 as a touchscreen to operate as both user controls 170 and display 178. Logic device 168 may be configured to sense control input signals from user controls 170 and respond to sensed control input signals received therefrom. In some embodiments, portions of display 178 and/or user controls 170 may be implemented by appropriate portions of a tablet, a laptop computer, a desktop computer, and/or other types of devices.

In various embodiments, user controls 170 may be configured to include one or more other user-activated mechanisms to provide various other control operations of imaging system 100, such as auto-focus, menu enable and selection, field of view (FoV), brightness, contrast, gain, offset, spatial, temporal, and/or various other features and/or parameters.

Imaging system 100 may include various types of other sensors 180 including, for example, microphones, navigation sensors, temperature sensors, and/or other sensors as appropriate.

Logic device 168 may be configured to receive and pass images from imager interface 166 and signals and data from sensors 180, and/or user controls 170 to a host system and/or other external devices (e.g., remote systems) through communication interface 174 (e.g., through wired and/or wireless communications). In this regard, communication interface 174 may be implemented to provide wired communication over a cable and/or wireless communication over an antenna. For example, communication interface 174 may include one or more wired or wireless communication components, such as an Ethernet connection, a wireless local area network (WLAN) component based on the IEEE 802.11 standards, a wireless broadband component, mobile cellular component, a wireless satellite component, or various other types of wireless communication components including radio frequency (RF), microwave frequency (MWF), and/or infrared frequency (IRF) components configured for communication with a network. As such, communication interface 174 may include an antenna coupled thereto for wireless communication purposes. In other embodiments, the communication interface 174 may be configured to interface with a DSL (e.g., Digital Subscriber Line) modem, a PSTN (Public Switched Telephone Network) modem, an Ethernet device, and/or various other types of wired and/or wireless network communication devices configured for communication with a network.

In some embodiments, a network may be implemented as a single network or a combination of multiple networks. For example, in various embodiments, the network may include the Internet and/or one or more intranets, landline networks, wireless networks, and/or other appropriate types of communication networks. In another example, the network may include a wireless telecommunications network (e.g., cellular phone network) configured to communicate with other communication networks, such as the Internet. As such, in various embodiments, imaging system 100 and/or its individual associated components may be associated with a particular network link such as for example a URL (Uniform Resource Locator), an IP (Internet Protocol) address, and/or a mobile phone number.

Imaging system 100 may include various other components 182 such as speakers, additional displays, visual indicators (e.g., recording indicators), vibration actuators, a battery or other power supply (e.g., rechargeable or otherwise), and/or additional components as appropriate for particular implementations.

Although various features of imaging system 100 are illustrated together in FIG. 1, any of the various illustrated components and subcomponents may be implemented in a distributed manner and used remotely from each other as appropriate (e.g., through appropriate wired and/or wireless network communication).

As discussed, a flat warm filter used with a cold thermal imager may cause non-uniformities in thermal images as a result of undesired out-of-band infrared radiation reflected by the flat warm filter. These difficulties are further demonstrated in FIGS. 2A-D.

Figure 2A:
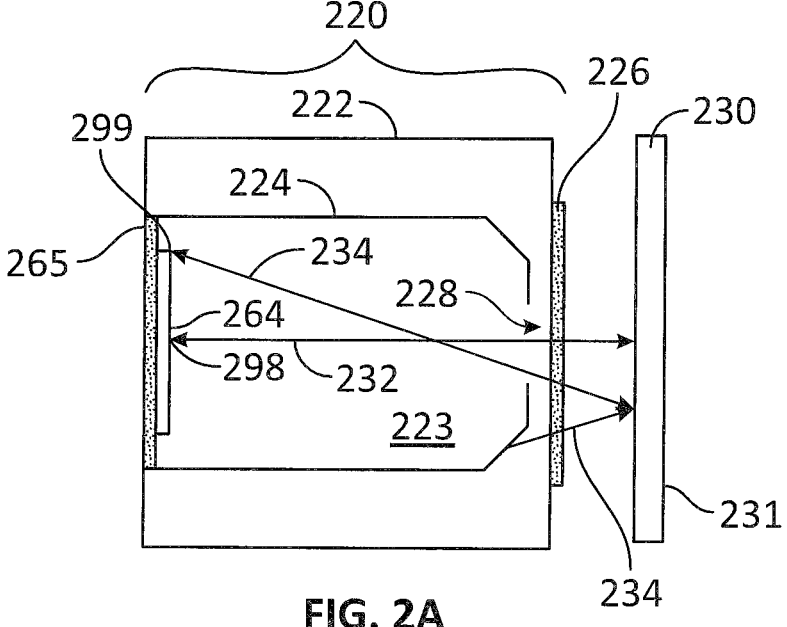
FIG. 2A illustrates an integrated dewar cooler assembly (IDCA) assembly and a flat warm filter in accordance with an embodiment of the disclosure.

For example, FIG. 2A illustrates an IDCA 220 including a dewar 222, a cryocooler 265, an interior volume 223, a coldshield 224, a window 226, a coldstop 228, and a thermal imager 264, all of which may be implemented in a similar manner as IDCA 120 of FIG. 1. However, FIG. 2A further includes a flat warm filter 230.

In this regard, one of the principal limitations of a cooled thermal imaging system of the type illustrated in FIG. 2A is the parasitic infrared radiation that is inherent in various optical elements such as flat warm filter 230 and any lenses that are at ambient environmental temperature (e.g., warmer than the cooled thermal imager 264). As a result, thermal imager 264 is never truly in darkness, even when a scene being imaged (e.g., scene 110) is very cold. In particular, although flat warm filter 230 is designed to limit the wavelength range of infrared radiation received by thermal imager 264, it will nevertheless reflect infrared wavelengths that are outside the passband of flat warm filter 230.

Flat warm filter 230 positioned external to IDCA 220 tends to create non-uniformities in thermal images captured by thermal imager 264 due to a reflection of the cold thermal imager 264 back onto itself, while the corners of the thermal image will be much warmer than the center because of reflections of warm surfaces inside the camera. This problem is particularly pronounced at the long integration times that are often used to provide adequate signal-to-noise performance when the thermal imager 264 images a low background (e.g., when flat warm filter 230 has a narrow wavelength range and the scene 110 is at ambient environmental temperatures).

For example, as shown in FIG. 2A, a center ray 232 of infrared radiation is emitted from a central portion 298 of a surface of thermal imager 264, is passed through window 226, and is received by flat surface 231 of flat warm filter 230. Flat surface 231 reflects center ray 232 back through window 226 and into interior volume 223 where it is received at center portion 298 of the surface of thermal imager 264, thus causing the center portion of a captured thermal image to appear cold.

As also shown in FIG. 2A, a corner ray 234 of infrared radiation is emitted from an uncontrolled temperature region outside coldshield 224 (e.g., corresponding to a higher temperature than interior volume 223), is passed through window 226, and is received by flat surface 231 of flat warm filter 230. Flat surface 231 reflects corner ray 234 back through window 226 and into interior volume 223 where it is received at a corner portion 299 of the surface of thermal imager 264, thus causing the corner portion of a captured thermal image to appear warm.

Figure 2B:
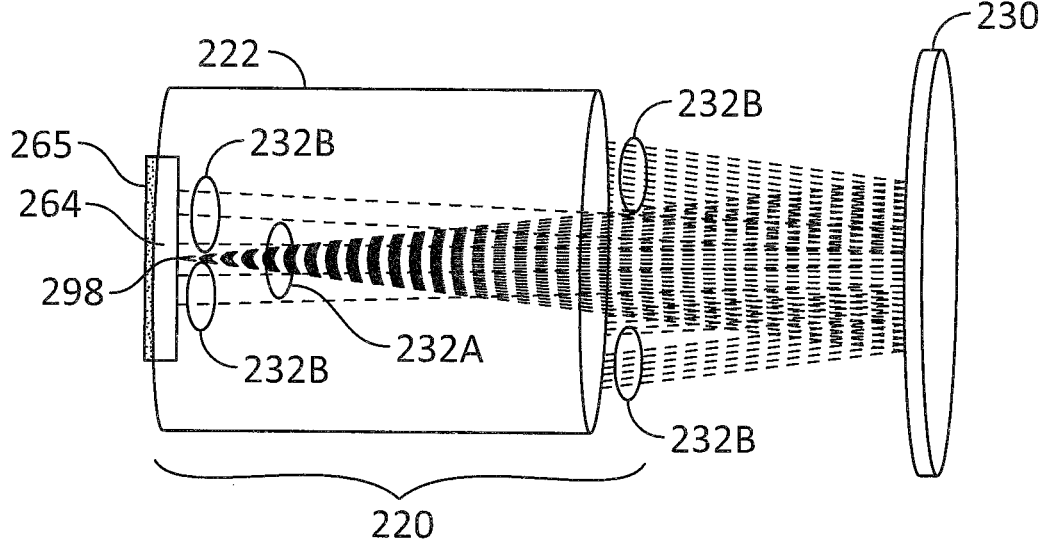
FIGS. 2B-C illustrate infrared radiation reflected by the flat warm filter of FIG. 2A in accordance with embodiments of the disclosure.
Figure 2C:
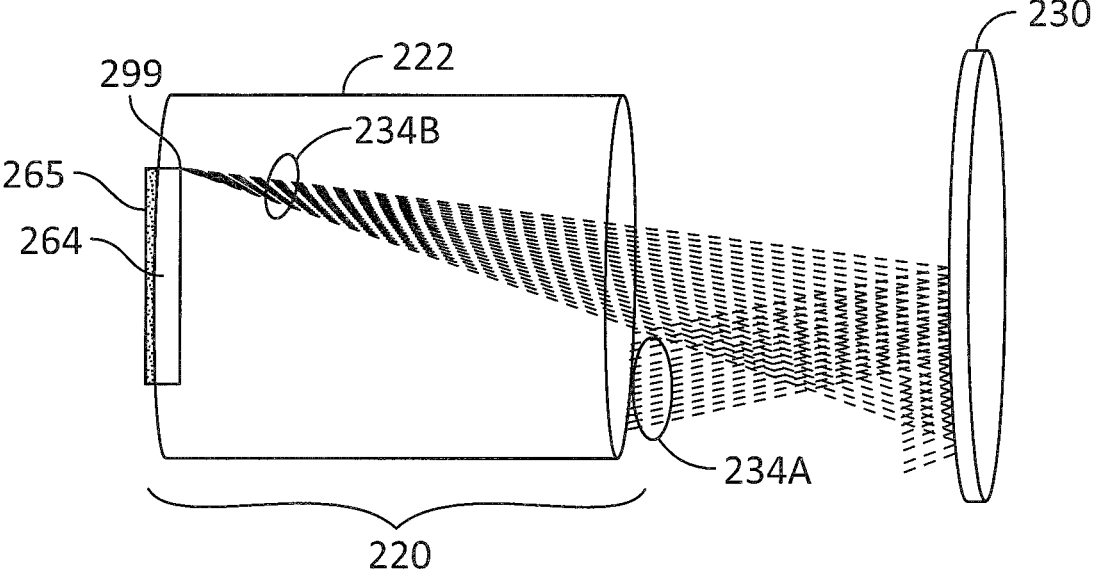

FIG. 2B illustrates additional emitted rays 232A and reflected rays 232B associated with center portion 298. FIG. 2C illustrates additional emitted rays 234A and reflected rays 234B associated with corner portion 299.

Figure 2D:
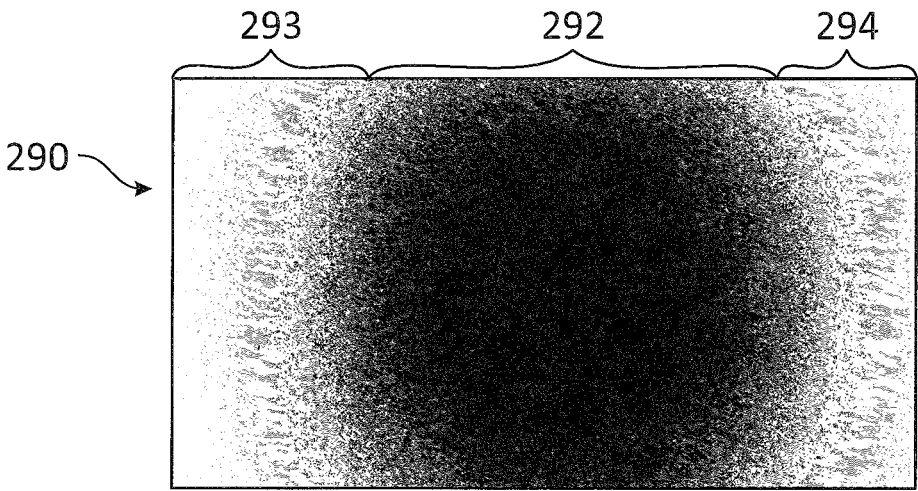
FIG. 2D illustrates a thermal image captured by a thermal imager of the IDCA of FIG. 2A in accordance with an embodiment of the disclosure.

FIG. 2D illustrates a thermal image 290 captured by thermal imager 264. As shown, thermal image 290 includes a central cold region 292 (e.g., cold spot) associated with rays 232 and 232B. Thermal image 290 further includes side warm regions 293 and 294 associated with rays 234 and 234B. As a result of the reflections caused by flat warm filter 230, thermal image 290 exhibits substantial non-uniformity across regions 292, 293, and 294.

The non-uniformities associated with the embodiments of FIGS. 2A-D using flat warm filter 230 may be alleviated by replacing flat warm filter 230 with an optical element with a curved surface configured to reflect infrared radiation in a uniform distribution over a field of view of thermal imager 164.

Figure 3A:
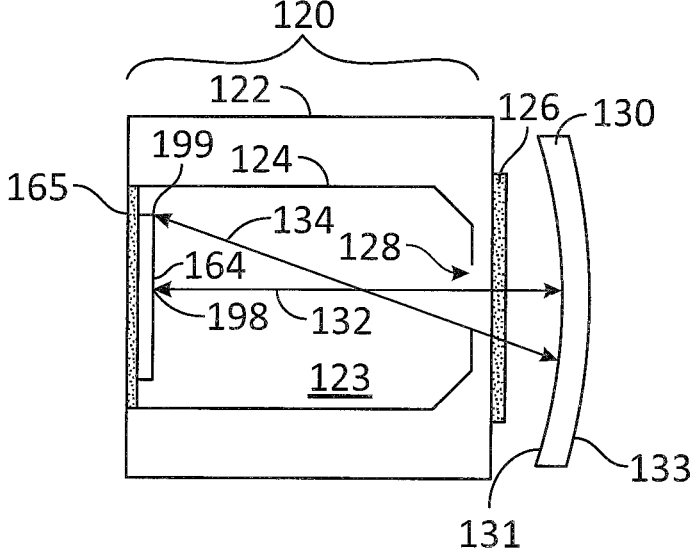
FIG. 3A illustrates an IDCA and a curved warm filter in accordance with an embodiment of the disclosure.

For example, FIG. 3A illustrates IDCA 120 and curved warm filter 130 of FIG. 1. As shown, curved warm filter 130 includes a curved concave surface 131 facing thermal imager 164 and an opposite curved convex surface 133. In addition, curved warm filter 130 exhibits a uniform thickness between curved concave surface 131 and curved convex surface 133 to prevent curved warm filter 130 from operating as a lens (e.g., to prevent inadvertent distortion in the filtered infrared radiation 115 passed to thermal imager 164). In some embodiments, curved warm filter 130 may be configured as thin as possible to reduce bulk absorption in the filter body and also to minimize infrared radiation emissions from the curved warm filter 130 itself.

In some embodiments, curved concave surface 131 may be a spherical surface with a radius of curvature equal to a distance from curved concave surface 131 to center portion 198 of thermal imager 164. In some embodiments, curved concave surface 131 may be aspherical.

In FIG. 3A, a center ray 132 of infrared radiation is emitted from a center portion 198 of a surface of thermal imager 164, is passed through window 126, and is received by curved warm filter 130. The curved surface of curved warm filter 130 reflects center ray 132 back through window 126 and into interior volume 123 where it is received at center portion 198 of the surface of thermal imager 164, thus causing the center portion of a captured thermal image to appear cold.

As also shown in FIG. 3A, a corner ray 134 of infrared radiation is emitted from a corner portion 199 of a surface of thermal imager 164, is passed through window 126, and is received by curved warm filter 130. The curved surface of curved warm filter 130 reflects corner ray 134 back through window 126 and into interior volume 123 where it is received at corner portion 199 of the surface of thermal imager 164, thus causing the corner portion of a captured thermal image to also appear cold.

Figure 3B:
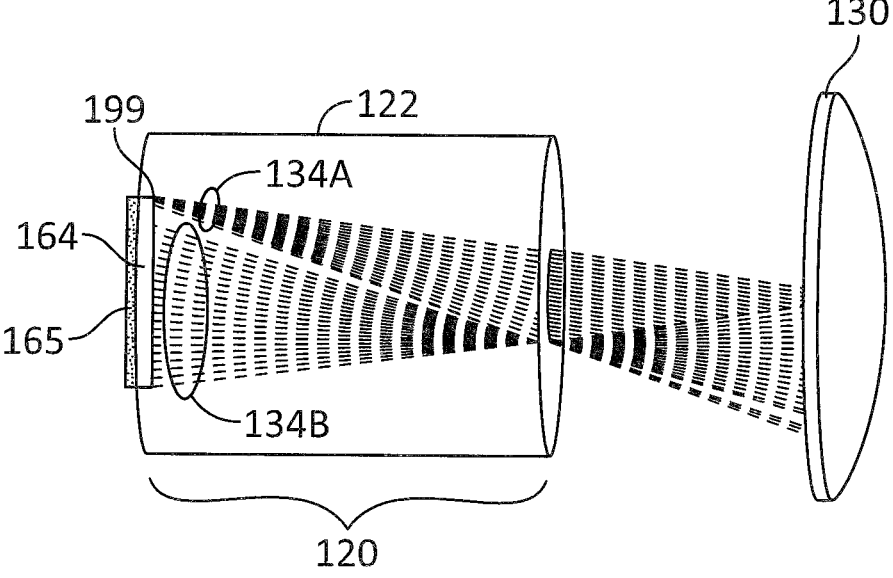
FIGS. 3B-C illustrate infrared radiation reflected by the curved warm filter of FIG. 3A in accordance with embodiments of the disclosure.
Figure 3C:
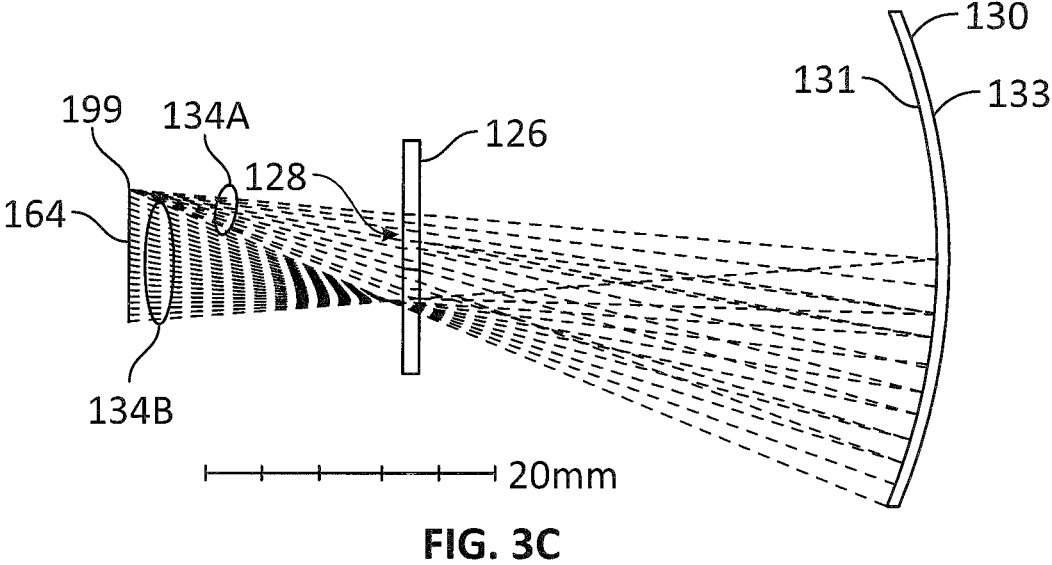

FIGS. 3B-C illustrate additional emitted rays 134A and reflected rays 134B associated with corner portion 199. As shown, curved concave surface 131 of curved warm filter 130 reflects rays 134B in a uniform distribution over the surface of thermal imager 164 and in a uniform distribution over the field of view of thermal imager 164 defined by coldstop 128.

In this regard, the solid angle viewed by each sensor of thermal imager 164 is defined by a projected area of coldstop 128 as viewed by each sensor at the height of coldstop 128. Within the solid angle view of each sensor, any rays 134B reflected by curved concave surface 131 of curved warm filter 130 will return back to thermal imager 164 through coldstop 128.

Figure 3D:
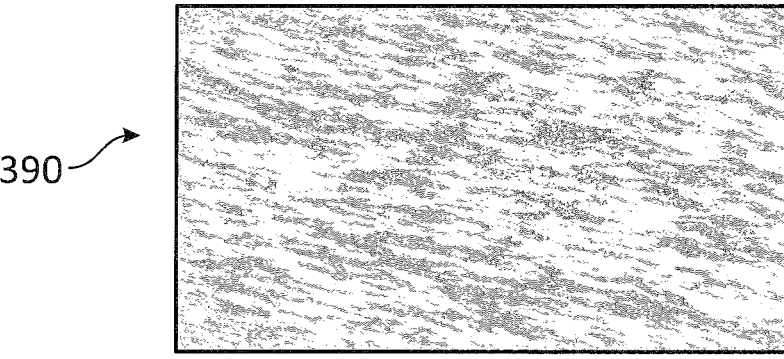
FIG. 3D illustrates a thermal image captured by a thermal imager of the IDCA of FIG. 3A in accordance with an embodiment of the disclosure.

FIG. 3D illustrates a thermal image 390 captured by thermal imager 164 using the configuration of FIG. 3A. As shown, thermal image 390 exhibits substantial uniformity across the entirety of the image and does not include contrasting central cold and side warm regions. Rather, the entirety of thermal image 390 appears cold due to the uniform distribution of reflected rays 134B. Thus, thermal image 390 captured by thermal imager 164 in the configuration of FIG. 3A exhibits improved uniformity in comparison with thermal image 290 captured by thermal imager 264 in the configuration of FIG. 2A.

As a result of the uniform distribution of reflected rays 134B by curved warm filter 130, the integration time of thermal imager 164 may be increased over what would otherwise be possible with flat warm filter 230. In some embodiments, the reduced levels of reflected rays 134B captured in thermal images may reduce shot noise, thus resulting in thermal images with improved temporal noise characteristics. Such improvements are particularly useful in gas detection operations that utilize long integration times (e.g., methane gas imaging) due to the relatively low backgrounds in the 3.2 micron to 3.4 micron wavelength range for ambient environmental temperatures associated with scene 110 (e.g., 20 C).

Figure 4:
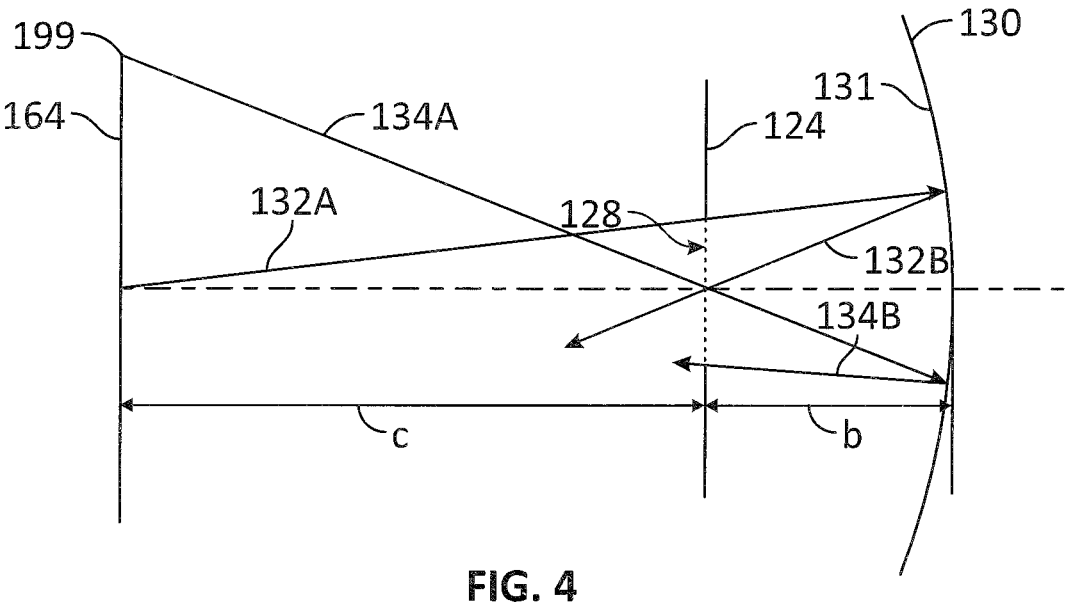
FIG. 4 illustrates example dimensions and ray traces associated with a curved warm filter in accordance with an embodiment of the disclosure.

FIG. 4 illustrates example dimensions and ray traces associated with curved warm filter 130 in accordance with an embodiment of the disclosure. FIG. 4 identifies a distance b from curved concave surface 131 of curved warm filter 130 to coldstop 128, and a distance c from coldstop 128 to thermal imager 164. FIG. 4 further illustrates emitted rays 132A/134A and corresponding reflected rays 132B/134B.

In some embodiments, distance b can be determined by the following equation 1, where T is a magnification corresponding to a diameter of coldstop 128 divided by a diagonal dimension of thermal imager 164:

$$b = \frac{\Gamma \cdot c}{1 - \Gamma} \qquad \text{(equation 1)}$$

In some embodiments, a focal length f of curved concave surface 131 can be determined by the following equation 2:

$$f = \frac{\Gamma \cdot c}{1 - \Gamma^2} \qquad \text{(equation 2)}$$

In one embodiment, applying a typical Γ value of 0.35 and a typical distance c of 28 mm to equations 1 and 2 results in a distance b of 15 mm, an f value of 11.2 mm, and curved concave surface 131 having a spherical contour with a radius of 22.4 mm (e.g., double the focal length f).

In another embodiment, distance c may be 20 mm, coldstop 128 may have a diameter of 6.7 mm corresponding to an F-number F/3. If thermal imager 164 is implemented with 320×240 pixels (each corresponding to a sensor) with each pixel having a size of 25 microns, then thermal imager 164 will exhibit a diagonal dimension of 10 mm. Such parameters provide a magnification T value of 0.67. Applying these values to equations 1 and 2 provide a distance b of 40.6 mm, an f value of 24.3 mm, and curved concave surface 131 having a spherical contour with a radius of 48.6 mm.

In some embodiments, the various parameters discussed above may be determined while imaging a point on thermal imager 164 close to coldstop 128. In addition, to ensure that thermal imager 164 receives only "cold" infrared radiation (e.g., does not receive extraneous infrared radiation emitted by portions of imaging system 100 external to coldshield 124) the image of thermal imager 164 may be smaller than coldstop 128.

Figure 5A:
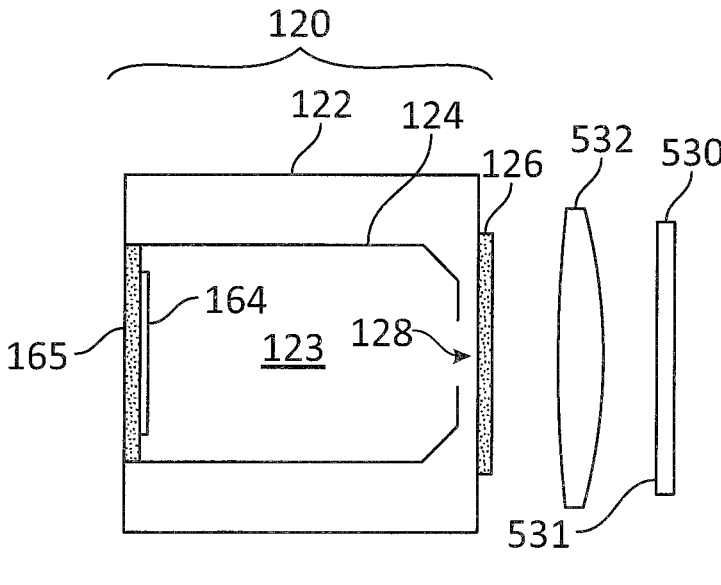
FIG. 5A illustrates an IDCA and a lens with a flat warm filter in accordance with an embodiment of the disclosure.

The non-uniformities associated with the embodiments of FIGS. 2A-D using flat warm filter 230 may also be alleviated by adding an optical element with a curved surface configured to reflect infrared radiation in a uniform distribution over a field of view of thermal imager 164. For example, in some embodiments, a flat warm filter and one or more lenses may be used in place of curved warm filter 130 or added to flat warm filter 230. In this regard, FIG. 5A illustrates IDCA 120 provided with a flat warm filter 530 and a lens 532 in accordance with an embodiment of the disclosure.

Although flat warm filter 530 includes a flat surface 531 (e.g., similar to flat warm filter 230 and flat surface 231 discussed in FIG. 2A), lens 532 is advantageously provided to shape infrared radiation in a manner that achieves the benefits discussed with regard to the curved warm filter 130 configuration of FIG. 3A.

Figure 5B:
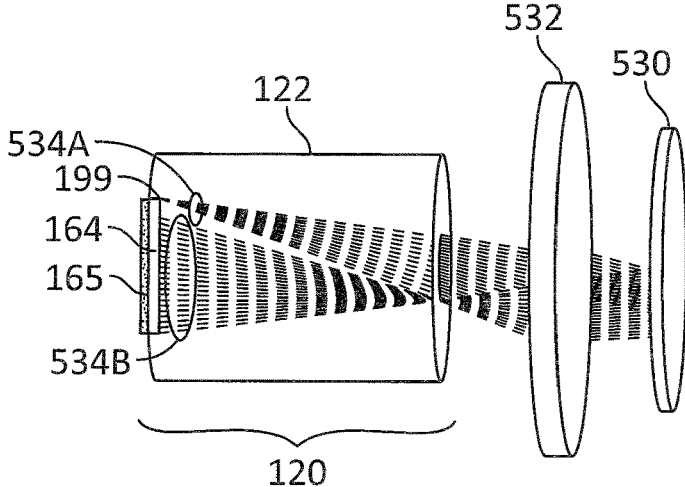
FIGS. 5B-C illustrate infrared radiation reflected by the flat warm filter and shaped by the lens of FIG. 5A in accordance with embodiments of the disclosure.
Figure 5C:
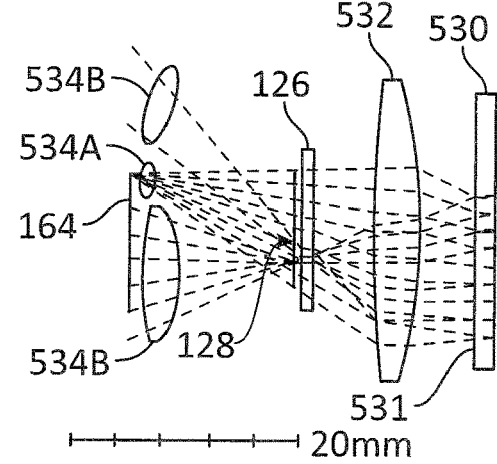

For example, FIGS. 5B-C illustrate emitted rays 534A and reflected rays 534B associated with corner portion 199. As shown, emitted rays 534A pass through lens 532 and are reflected by flat surface 531 of flat warm filter 530 to provide reflected rays 534B. As reflected rays 534B pass back through lens 532 toward thermal imager 164, they are shaped by lens 532 to provide a uniform distribution over the surface of thermal imager 164 and in a uniform distribution over the field of view of thermal imager 164 defined by coldstop 128 as shown.

Figure 5D:
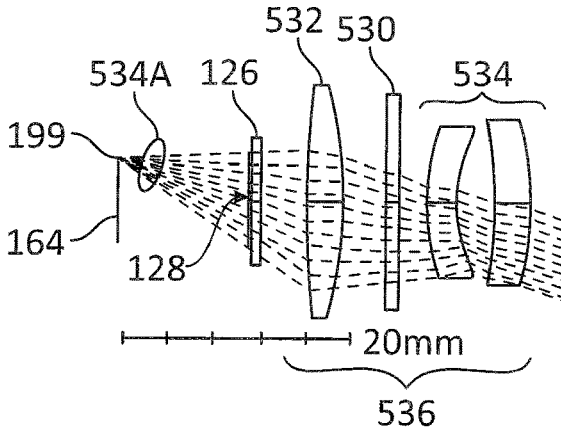
FIG. 5D illustrates additional optical components provided with the lens and the flat warm filter of FIG. 5A in accordance with an embodiment of the disclosure.

As discussed, additional optical elements may be provided. For example, FIG. 5D illustrates additional lenses 534 that may be provided as part of an overall optical system 536 to be used with thermal imager 164 in accordance with an embodiment of the disclosure. In some implementations, the embodiments set forth in FIGS. 5A-D using flat warm filter 530 may be less prone to alignment errors in comparison to the embodiments set forth in FIGS. 3A-C using curved warm filter 130 as filters 130/530 are removed and replaced because flat warm filter 530 is not relied on to provide the uniform distribution (e.g., lens 532 provides the uniform distribution in such embodiments). In some embodiments, flat warm filter 530 and lenses 532/534 may be removed and replaced together as a single optical system (e.g., the whole objective may be removed and replaced).

The operation of imaging system 100 and the various additional implementations discussed herein can be further understood with reference to FIG. 6 that illustrates a process of capturing thermal images in accordance with an embodiment of the disclosure.

In block 610, a warm filter (e.g., curved warm filter 130 or flat warm filter 530) is selected. For example, a warm filter 130/530 may be selected with a particular wavelength range (e.g., passband) corresponding to a feature (e.g., gas 113) desired to be detected in scene 110. In some embodiments, the selection may be performed by a user of imaging system 100 (e.g., an operator of a gas detection camera) and/or by logic device 168 (e.g., in the case of an automated or semi-automated gas detection process).

In block 620, the selected warm filter 130/530 is positioned in an optical path between IDCA 120 and scene 110. In some embodiments, such positioning may be performed by a user of imaging system 100, a retractable paddle, a filter wheel, and/or other techniques. Accordingly, imaging system 100 may be selectively configured to capture thermal images of different wavelength ranges determined by different warm filters 130/530 without disturbing IDCA 120.

In block 630, infrared radiation 114 from scene 110 is received by warm filter 130/530. In block 640, warm filter 130/530 is applied to infrared radiation 114 and passes filtered infrared radiation 115 such that it is transmitted through window 126 and into interior volume 123.

In block 650, thermal imager 164, other portions of IDCA 120, and/or other portions of imaging system 100 emit infrared radiation to warm filter 130/530 (e.g., emitted rays 134A or 534A, also referred to as parasitic infrared radiation). For example, in some embodiments, the emitted infrared radiation may include wavelengths outside the passband of warm filter 130/530 (e.g., out-of-band radiation).

In block 660, warm filter 130/530 reflects the emitted infrared radiation toward thermal imager 164 (e.g., reflected rays 134B or 534B). In the case of curved warm filter 130, block 660 includes curved concave surface 131 reflecting the emitted infrared radiation in a uniform distribution as discussed. In the case of flat warm filter 530, block 660 includes flat surface 531 reflecting the emitted infrared radiation with a conventional distribution, and lens 532 further shaping the reflected infrared radiation to provide a uniform distribution as discussed.

In block 670, thermal imager 164 receives filtered infrared radiation 115 and the reflected infrared radiation. In block 680, thermal imager 164 captures a thermal image in response to filtered infrared radiation 115 and the reflected infrared radiation. As discussed, the uniform distribution of the reflected infrared radiation provided by curved warm filter 130 and/or lens 532 reduce or prevent the non-uniformities shown in FIG. 2D. As a result, the thermal image captured in block 680 may more accurately represent filtered infrared radiation 115 received from scene 110 without the need to apply substantial offset correction terms to reduce such non-uniformities.

In block 690, logic device 168 processes the captured thermal image, for example, to detect the presence of gas 113 or another feature in scene 110.

In various embodiments, any or all of the blocks of FIG. 6 may be repeated to capture thermal images in response to different wavelength ranges to facilitate the detection of various gases or other features of interest in scene 110. For example, different warm filters 130/530 may be selected and positioned to provide filtered infrared radiation 115 in different wavelength ranges. Because warm filters 130/530 are positioned external to IDCA 120, no changes to IDCA 120 are required for capturing the different wavelength ranges.

Additional embodiments and applications are also contemplated. For example, in some implementations, curved warm filter 130 and/or flat warm filter 530 with lens 532 may be positioned on a filter wheel used to selectively position them in front of window 126 and/or a similar warm window of a camera (e.g., using an InSb thermal imager) configured to capture thermal images in a 3 micron to 5 micron wavelength range or a broadband 1.5 micron to 5.7 micron wavelength range (e.g., in some embodiments, fixed filters corresponding to such wavelength ranges may be provided in IDCA 120; such filters are also referred to as cold filters as they are provided within the cooled interior volume 123 of IDCA 120).

For example, warm filter 130/530 may be used to temporarily operate a 3 micron to 5 micron camera with a narrower wavelength range (e.g., 3.2 microns to 3.4 microns or any other configuration where the warm filter 130/530 passband is completely contained within the bandpass of the 3 micron to 5 micron cold filter in the camera). As another example, warm filter 130/530 may be used to temporarily operate a broadband 1.5 micron to 5.7 micron camera with a narrower wavelength range that is completely contained within the bandpass of the 1.5 micron to 5.7 micron cold filter in the camera.

In some applications, it may be desirable to configure warm filter 130/530 to capture thermal images of particular materials. For example, polyethylene film may be imaged as it leaves a production machine in a continuous ribbon known as a "web." In such cases, a warm filter 130/530 may be used with a wavelength range (e.g., passband) centered at 3.44 microns to make the web look opaque in thermal images captured by a midwave camera. This wavelength range corresponds to a strong absorption feature in solid polyethylene. The use of a warm filter 130/530 that may be operated at ambient environmental temperature permits the use of increased integration times when imaging such material.

Where applicable, various embodiments provided by the present disclosure can be implemented using hardware, software, or combinations of hardware and software. Also where applicable, the various hardware components and/or software components set forth herein can be combined into composite components comprising software, hardware, and/or both without departing from the spirit of the present disclosure. Where applicable, the various hardware components and/or software components set forth herein can be separated into sub-components comprising software, hardware, or both without departing from the spirit of the present disclosure. In addition, where applicable, it is contemplated that software components can be implemented as hardware components, and vice-versa.

Software in accordance with the present disclosure, such as program code and/or data, can be stored on one or more computer readable mediums. It is also contemplated that software identified herein can be implemented using one or more general purpose or specific purpose computers and/or computer systems, networked and/or otherwise. Where applicable, the ordering of various steps described herein can be changed, combined into composite steps, and/or separated into sub-steps to provide features described herein.

Embodiments described above illustrate but do not limit the invention. It should also be understood that numerous modifications and variations are possible in accordance with the principles of the present invention. Accordingly, the scope of the invention is defined only by the following claims.

What is claimed is:

1. A system comprising:
an integrated dewar cooler assembly (IDCA) configured to maintain an interior volume at a constant temperature;
a thermal imager disposed within the interior volume and configured to capture thermal images; and
an optical element external to the IDCA and configured to provide reflected infrared radiation in response to emitted infrared radiation from the thermal imager;
wherein the IDCA further comprises a coldshield comprising a coldstop configured to define the interior volume and a field of view of the thermal imager; and
wherein for each sensor of the thermal imager, within a solid angle viewed by the sensor through the coldstop, any ray reflected by the optical element returns back to the thermal imager through the coldstop;
wherein rays emitted by the thermal imager within the field of view of the thermal imager and reflected and provided by the optical element are received by the thermal imager.

2. The system of claim 1, wherein corner rays are reflected by the optical element in a uniform distribution over the thermal imager.

3. The system of claim 1, wherein:
the optical element comprises a curved concave surface configured to reflect the emitted infrared radiation to provide the reflected infrared radiation;

the optical element is a curved filter configured to pass filtered infrared radiation from an external scene to the thermal imager to be captured in the thermal images; and
the filter is configured to be selectively replaced to pass different filtered infrared radiation corresponding to different wavelength ranges.

4. The system of claim 3, wherein:

$$b = \frac{\Gamma \cdot c}{1 - \Gamma} \text{ and}$$

$$f = \frac{\Gamma \cdot c}{1 - \Gamma^2}$$

where:
b is a distance from the curved concave surface to the coldstop;
c is a distance from the coldstop to the thermal imager;
$\Gamma$ is a magnification corresponding to a diameter of the coldstop divided by a diagonal dimension of the thermal imager; and
f is a focal length of the curved concave surface.

5. The system of claim 3, wherein:
the filter comprises a curved convex surface opposite the curved concave surface; and
the filter comprises a uniform thickness between the curved concave surface and the curved convex surface.

6. The system of claim 1, wherein:
the IDCA comprises a window sealing the IDCA and configured to pass the emitted infrared radiation and the reflected infrared radiation between the thermal imager and the optical element; and
the optical element exhibits a higher temperature than the interior volume.

7. The system of claim 1, wherein:
the system is a gas detection camera; and
the optical element is configured to be selectively replaced without disturbing the IDCA.

8. A system comprising:
an integrated dewar cooler assembly (IDCA) configured to maintain an interior volume at a constant temperature;
a thermal imager disposed within the interior volume and configured to capture thermal images; and
a lens external to the IDCA and configured to provide reflected infrared radiation in response to emitted infrared radiation from the thermal imager;
wherein:
the IDCA comprises a coldshield comprising a coldstop configured to define the interior volume and a field of view of the thermal imager;
the system further comprises a filter external to the IDCA and configured to pass filtered infrared radiation from an external scene to the lens;
the lens is configured to pass the filtered infrared radiation to the thermal imager to be captured in the thermal images;
the filter comprises a flat surface facing the lens and configured to reflect the emitted infrared radiation to provide the reflected infrared radiation to the lens; and
corner rays emitted by a corner portion of the thermal imager pass through the lens and are reflected by the flat surface of the filter to provide reflected rays that pass back through the lens toward the thermal imager and are shaped by the lens to provide a uniform distribution over the thermal imager.

9. The system of claim 8, wherein:

the reflected rays which pass back through the lens toward the thermal imager are shaped by the lens to provide a uniform distribution over a field of view of the thermal imager; and the filter is configured to be selectively replaced to pass different filtered infrared radiation corresponding to different wavelength ranges.

10. The system of claim 8, wherein the filter is flat.

11. A method of using the system of claim 8, the method comprising:

passing, by the filter, filtered infrared radiation from an external scene to the lens;

passing, by the lens, the filtered infrared radiation to the thermal imager to be captured in the thermal images;

emitting the corner rays by the corner portion of the thermal imager;

passing the corner rays through the lens; and reflecting the corner rays passed through the lens by the flat surface of the filter to provide the reflected rays which pass back through the lens toward the thermal imager and are shaped by the lens to provide the uniform distribution over the thermal imager;

wherein the filter is configured to be selectively replaced to pass different filtered infrared radiation corresponding to different wavelength ranges.

12. The method of claim 11, wherein:

the reflected rays that which back through the lens toward the thermal imager are shaped by the lens to provide a uniform distribution over a field of view of the thermal imager.

13. The method of claim 11, wherein the filter is flat.

14. A method comprising:

operating an integrated dewar cooler assembly (IDCA) of an imaging system to maintain an interior volume at a constant temperature, wherein the IDCA comprises a coldshield comprising a coldstop configured to define the interior volume and a field of view of the thermal imager;

operating a thermal imager disposed within the interior volume to capture thermal images; and providing, by an optical element external to the IDCA, reflected infrared radiation in a uniform distribution over a field of view of the thermal imager in response to emitted infrared radiation from the thermal imager;

wherein for each sensor of the thermal imager, within a solid angle viewed by the sensor through the coldstop, any ray in the reflected infrared radiation returns back to the thermal imager through the coldstop;

wherein the interior volume and the field of view of the thermal imager are defined by the coldstop of the coldshield disposed within the IDCA; and wherein the thermal imager does not receive extraneous infrared radiation emitted by portions of the imaging system external to the coldshield.

15. The method of claim 14, wherein corner rays are reflected in a uniform distribution over the thermal imager.

16. The method of claim 14, wherein:

the providing comprises reflecting, by a curved concave surface of the optical element, the emitted infrared radiation to provide the reflected infrared radiation in the uniform distribution;

the optical element is a curved filter;

the method further comprises passing, by the filter, filtered infrared radiation from an external scene to the thermal imager to be captured in the thermal images; and the filter is configured to be selectively replaced to pass different filtered infrared radiation corresponding to different wavelength ranges.

17. The method of claim 16, wherein:

the curved concave surface exhibits a spherical contour;

$$b = \frac{\Gamma \cdot c}{1 - \Gamma} \text{ and}$$

$$f = \frac{\Gamma \cdot c}{1 - \Gamma^2}$$

where:

b is a distance from the curved concave surface to the coldstop;

c is a distance from the coldstop to the thermal imager;

$\Gamma$ is a magnification corresponding to a diameter of the coldstop divided by a diagonal dimension of the thermal imager; and f is a focal length of the curved concave surface.

18. The method of claim 16, wherein:

the filter comprises a curved convex surface opposite the curved concave surface; and the filter comprises a uniform thickness between the curved concave surface and the curved convex surface.

19. The method of claim 14, further comprising:

passing, through a window sealing the IDCA, the emitted infrared radiation and the reflected infrared radiation between the thermal imager and the optical element; and wherein the optical element exhibits a higher temperature than the interior volume.

20. The method of claim 14, wherein:

the method is performed by a gas detection camera; and the optical element is configured to be selectively replaced without disturbing the IDCA.

* * * * *